United States Patent
Ji et al.

(10) Patent No.: US 9,538,507 B2
(45) Date of Patent: Jan. 3, 2017

(54) METHOD AND APPARATUS FOR TRANSMITTING CONTROL CHANNEL SIGNAL IN ORTHOGONAL FREQUENCY DIVISION MULTIPLEXING COMMUNICATION SYSTEM

(71) Applicant: Samsung Electronics Co., Ltd., Gyeonggi-do (KR)

(72) Inventors: Hyoung-Ju Ji, Seoul (KR); Youn-Sun Kim, Gyeonggi-do (KR); Ju-Ho Lee, Gyeonggi-do (KR); Joon-Young Cho, Gyeonggi-do (KR); Young-Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 14/374,892

(22) PCT Filed: Jan. 22, 2013

(86) PCT No.: PCT/KR2013/000510
§ 371 (c)(1),
(2) Date: Jul. 25, 2014

(87) PCT Pub. No.: WO2013/111962
PCT Pub. Date: Aug. 1, 2013

(65) Prior Publication Data
US 2015/0036606 A1    Feb. 5, 2015

(30) Foreign Application Priority Data

Jan. 25, 2012 (KR) .................. 10-2012-0007343

(51) Int. Cl.
*H04W 72/04* (2009.01)
*H04L 5/00* (2006.01)
*H04L 27/26* (2006.01)

(52) U.S. Cl.
CPC ........ *H04W 72/0406* (2013.01); *H04L 5/0007* (2013.01); *H04L 5/0026* (2013.01);
(Continued)

(58) Field of Classification Search
CPC ............... H04L 5/0007; H04L 27/2666; H04L 27/2675; H04L 5/0048; H04L 27/2613; H04J 11/0069; H04J 2011/0016; H04J 11/003; H04B 7/0615; H04B 7/0452; H04W 72/04; H04W 72/048; H04W 72/12; H04W 72/121; H04W 72/1263; H04W 72/1273; H04W 72/1278; H04W 72/1289
See application file for complete search history.

(56) References Cited

U.S. PATENT DOCUMENTS

2010/0110994 A1    5/2010  Ratsuk et al.
2010/0214972 A1    8/2010  Che et al.
(Continued)

FOREIGN PATENT DOCUMENTS

WO    WO 2011/103309 A2    8/2011

OTHER PUBLICATIONS

International Search Report dated Apr. 19, 2013 in connection with International Patent Application No. PCT/KR2013/000510, 5 pages.
(Continued)

*Primary Examiner* — Ashley Shivers

(57) ABSTRACT

The present invention is a method in which a base station transmits a control channel signal in an orthogonal frequency division multiplexing (OFDM) communication system, wherein the method configures a physical resource block (PRB) from multiple resource elements (REs) for a control channel signal for scheduling, allocates at least one RE to a response channel signal, the at least one RE occupying the time domain the same as that of the RE used
(Continued)

in a resource signal transmission in a data channel region of the PRB and occupying the frequency domain nearest to the RE used in the reference signal transmission, and transmits the control channel signal for scheduling and the response channel signal.

17 Claims, 15 Drawing Sheets

(52) U.S. Cl.
CPC .......... *H04L 5/0048* (2013.01); *H04L 5/0053* (2013.01); *H04L 5/0055* (2013.01); *H04L 5/0094* (2013.01); *H04L 27/2601* (2013.01)

(56) References Cited

U.S. PATENT DOCUMENTS

| | | |
|---|---|---|
| 2011/0249640 A1 | 10/2011 | Soong et al. |
| 2011/0286406 A1 | 11/2011 | Chen et al. |
| 2011/0293037 A1 | 12/2011 | Liu et al. |
| 2013/0182664 A1* | 7/2013 | Chen .................. H04W 72/042 370/329 |
| 2013/0188569 A1* | 7/2013 | He ........................ H04W 28/16 370/329 |
| 2013/0286997 A1* | 10/2013 | Davydov ............... H04B 7/024 370/329 |
| 2014/0050159 A1* | 2/2014 | Frenne ................ H04W 72/042 370/329 |

OTHER PUBLICATIONS

Written Opinion of International Searching Authority dated Apr. 19, 2013 in connection with International Patent Application No. PCT/KR2013/000510, 4 pages.

\* cited by examiner

METHOD AND APPARATUS FOR TRANSMITTING CONTROL CHANNEL SIGNAL IN ORTHOGONAL FREQUENCY DIVISION MULTIPLEXING COMMUNICATION SYSTEM

PRIORITY

The present application claims priority under 35 U.S.C. §365 to International Patent Application No. PCT/KR2013/000510 filed Jan. 22, 2013, entitled "METHOD AND APPARATUS FOR TRANSMITTING CONTROL CHANNEL SIGNAL IN ORTHOGONAL FREQUENCY DIVISION MULTIPLEXING COMMUNICATION SYSTEM". International Patent Application No. PCT/KR2013/000510 claims priority under 35 U.S.C. §365 and/or 35 U.S.C. §119(a) to Korean Patent Application No. 10-2012-0007343 filed Jan. 25, 2012, both of which are incorporated herein by reference into the present disclosure as if fully set forth herein.

TECHNICAL FIELD

The present invention relates generally to a method and an apparatus for transmitting a control channel signal in an orthogonal frequency division multiplexing (hereinafter, referred to as an OFDM).

BACKGROUND OF THE DISCLOSURE

In general, a mobile communication system was developed to provide voice services while guaranteeing activity of users. However, the mobile communication systems have extended their fields to a data providing service beyond the voice communication providing service and have now developed up to a level at which they can provide a high speed data service. In spite of such a development, current mobile communication systems are undergoing a deficiency of resources and users of current mobile communication systems require a service of a higher speed.

In order to satisfy such a request, a standard work with respect to a long term evolution-advanced (LTE-A) has been progressed in the $3^{rd}$ generation partnership project (3GPP) as one of the next generation mobile communication systems being developed. The LTE-A is a technique implementing communication based on a high speed packet having a transmission speed of a maximum of about 1 Gbps. To this end, various methods are discussed, for example, there are a method in which multiple base stations simultaneously provide a service to a specific area by multiplexing a structure of a network, and a method of increasing a number of a frequency bandwidth supported by one base station. In this case, interference between the base stations is increased, and in a case of an LTE control channel which currently uses all frequency bandwidths, it is difficult to avoid such interference.

Thus, a method of transmitting a control channel signal through a data channel by dividing a frequency resource between cells has been researched, and a technique enabling a terminal to the control channel signal in various channel circumstances and a technique supporting a multiplexing with another control channel signal are required.

SUMMARY

An aspect of the present invention is to address at least the above-mentioned problems and/or disadvantages and to provide at least the advantages described below. Accordingly, an aspect of an embodiment of the present invention is to provide a method and an apparatus for transmitting a downlink control channel signal in an OFDM communication system.

A method proposed in the present invention is a method of transmitting a control channel signal by a base station in an OFDM communication system. The method includes configuring a physical resource block (PRB) including a plurality of resource elements (REs) for the control channel signal for a scheduling, assigning at least one resource element (RE) occupying a time domain equal to that of an RE used in transmitting a reference signal in a data channel region of the PRB and occupying a frequency domain nearest to that of the RE used in transmitting the reference signal, to a response channel signal, and transmitting the control channel signal and the response channel signal.

Another method proposed in the present invention is a method of receiving a control channel signal by a terminal in an OFDM communication system. The method includes receiving a physical resource block (PRB) including a plurality of resource elements (REs) for the control channel signal for a scheduling, identifying at least one resource element (RE) occupying a time domain equal to that of an RE used in transmitting a reference signal in a data channel region of the PRB and occupying a frequency domain nearest to that of the RE used in transmitting the reference signal, and receiving a response channel signal and the control channel signal transmitted by using at least one RE.

An apparatus proposed in the present invention is a base station for transmitting a control channel signal in an OFDM communication system. The base station includes a generation unit configured to configure a physical resource block (PRB) including a plurality of resource elements (REs) for the control channel signal for a scheduling, and to assign at least one RE occupying a time domain equal to that of a resource element (RE) used in transmitting a reference signal in a data channel region of the PRB and occupying a frequency domain nearest to that of the RE used in transmitting the reference signal, to a response channel signal, and a transmission unit configured to transmits the control channel signal for the scheduling and the response channel signal.

Another apparatus proposed in the present invention is a terminal for receiving a control channel signal in an OFDM communication system. The terminal includes a resource element (RE) inverse mapping unit configured to receive a physical resource block (PRB) including a plurality of Resource Elements (REs) for the control channel signal for a scheduling, and to identify at least one RE occupying a time domain equal to that of an RE used in transmitting a reference signal in a data channel region of the PRB and occupying a frequency domain nearest to that of the RE used in transmitting the reference signal, and receiving unit configured to receive a response channel signal and the control channel signal for the scheduling transmitted by using at least one RE.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, embodiments of the present invention will be described in detail with reference to the accompanying drawings. The terms described below are defined in consideration of the functions of the present invention, and may be different according to users, intentions of the users, or customs. Therefore, the definitions of the terms should be determined based on the contents throughout the specification. A detailed description of known functions and configurations incorporated herein will be omitted if it may make the subject matter of the present invention rather unclear.

Although embodiments of the present invention are described based on a long term evolution (LTE) system and an LTE-advanced (LTE-A) system as an example in the present specification, the present invention can be applied without making any adjustment to other communication systems employing base station scheduling.

The orthogonal frequency division multiplexing (OFDM) transmission scheme is a data transmission scheme using a multi-carrier, and a kind of multi-carrier modulation (MCM) scheme, in which serially input symbol strings are converted in parallel, and the respective converted symbol strings are modulated with a plurality of mutually orthogonal sub-carriers, that is, a plurality of mutually orthogonal sub-channels, and are then transmitted.

In the OFDM scheme, a modulation signal is located at a second-dimensional resource configured by the time and the frequency. Resources on the time axis are distinguished from each other by different OFDM symbols, which are orthogonal to each other. Resources on the frequency axis are distinguished from each other by different sub-carriers, which are also orthogonal to each other. That is, in the OFDM scheme, by appointing a particular OFDM symbol on the time axis and appointing a particular sub-carrier on the frequency axis, it is possible to indicate one minimum unit resource, which is referred to as a resource element (RE). Different REs are orthogonal even after passing a frequency selective channel. Therefore, signals transmitted through different REs can be received by a receiver without causing interference with each other.

A physical channel is a channel of a physical layer for transmitting a modulation symbol obtained by modulating one or more encoded bit strings. In an orthogonal frequency division multiple access (OFDMA) system, an information string is transmitted by configuring a plurality of physical channels according to the use of the information string or a receiver for receiving the information string. Which RE one physical channel should be located on for transmission should be promised in advance between a transmitter and a receiver, and a rule for the same is referred to as "mapping".

Figure 1:
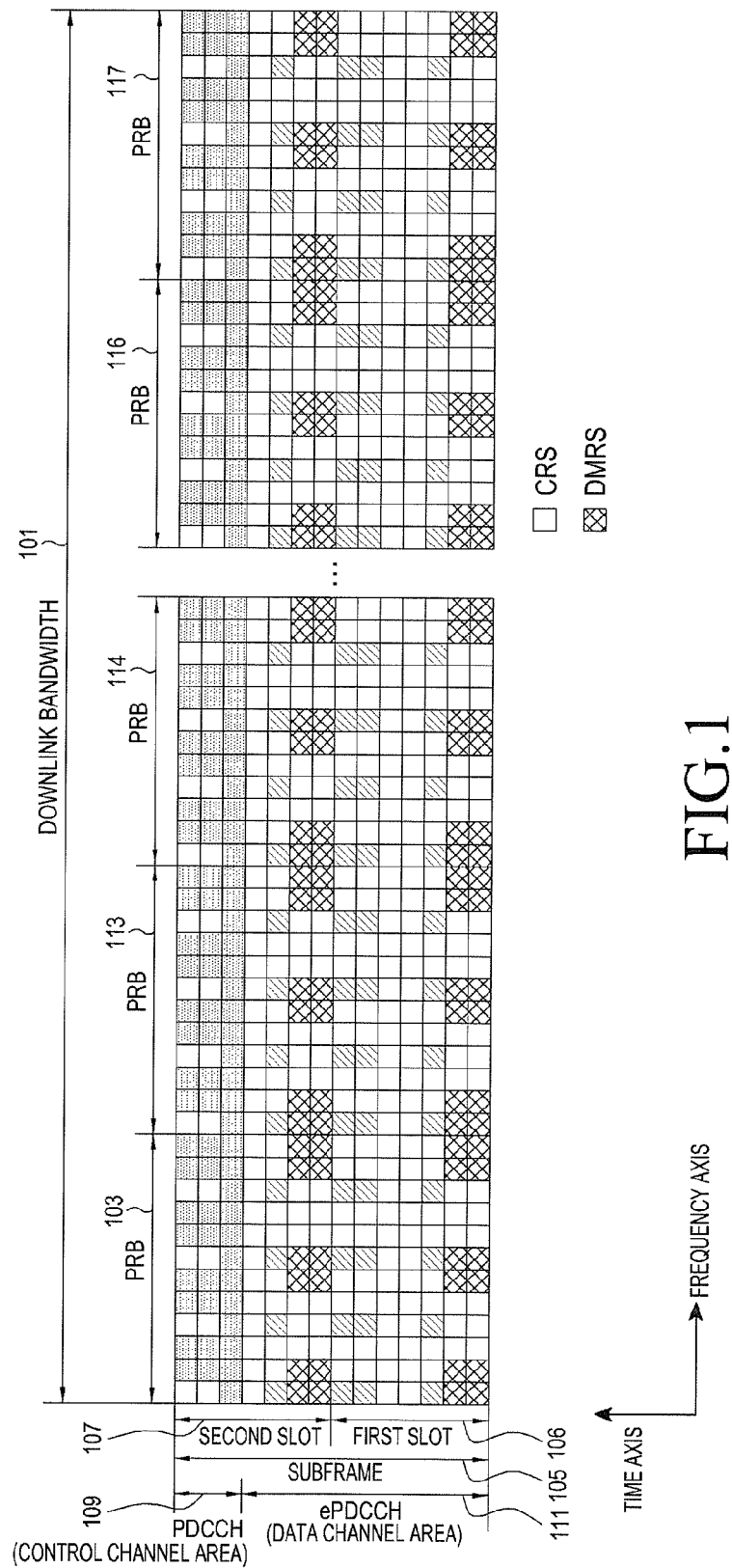
FIG. 1 is a view illustrating a DownLink (DL) frame structure in an OFDM communication system.

FIG. 1 is a view illustrating a downlink (DL) frame structure in an OFDM communication system.

The shown downlink bandwidth 101 includes a plurality of resource blocks (RB, hereinafter, referred to as RB), and each of physical resource blocks (PRBs, hereinafter, referred to as PRBs) 103, 113, 114, 116 and 117 may include 12 subcarriers arranged along a frequency axis and 14 or 12 OFDM symbols arranged along a time axis. Here, the PRB serves as a basic unit for resource allocation.

A reference signal (RS, hereinafter, referred to as RS) is received from a base station, and is a signal enabling a terminal to estimate a channel. In an LTE communication system, the RS includes a common reference signal (CRS, hereinafter, referred to as CRS) and a demodulation reference signal (DMRS, hereinafter, referred to as DMRS) as one of exclusive reference signals.

The CRS may be received by all terminals as a reference signal transmitted through overall downlink bandwidth 101, and is used in a channel estimation, generating feedback information of the terminal, or a demodulation of a control channel and a data channel. The DMRS is also a reference signal transmitted through the overall downlink bandwidth 101, is used in the demodulation of the data channel and the channel estimation of a specific terminal, and is not used in generating the feedback information of the terminal differently from the CRS. Therefore, the DMRS is transmitted through a PRB resource to be scheduled by the terminal.

On a time axis, a subframe 105 includes 2 slots having a length of 0.5 msec (millisecond), that is, the subframe 105 includes a first slot 106 and a second slot 107. A physical dedicated control channel (PDCCH, referred to as PDCCH) area 109 which is a control channel area and an enhanced PDCCH area 111 which is a data channel area are divided on the time axis and transmitted as shown in FIG. 1. This is for receiving and demodulating the control channel signal quickly. In addition, the PDCCH area 109 is located through the overall downlink bandwidth 101, and one control channel is divided into small units of control channels, therefore, the PDCCH area 109 is dispersed in the overall downlink bandwidth 101.

Hereinafter, the PDCCH area 109 is described in more detail with reference to FIG. 2.

Figure 2:
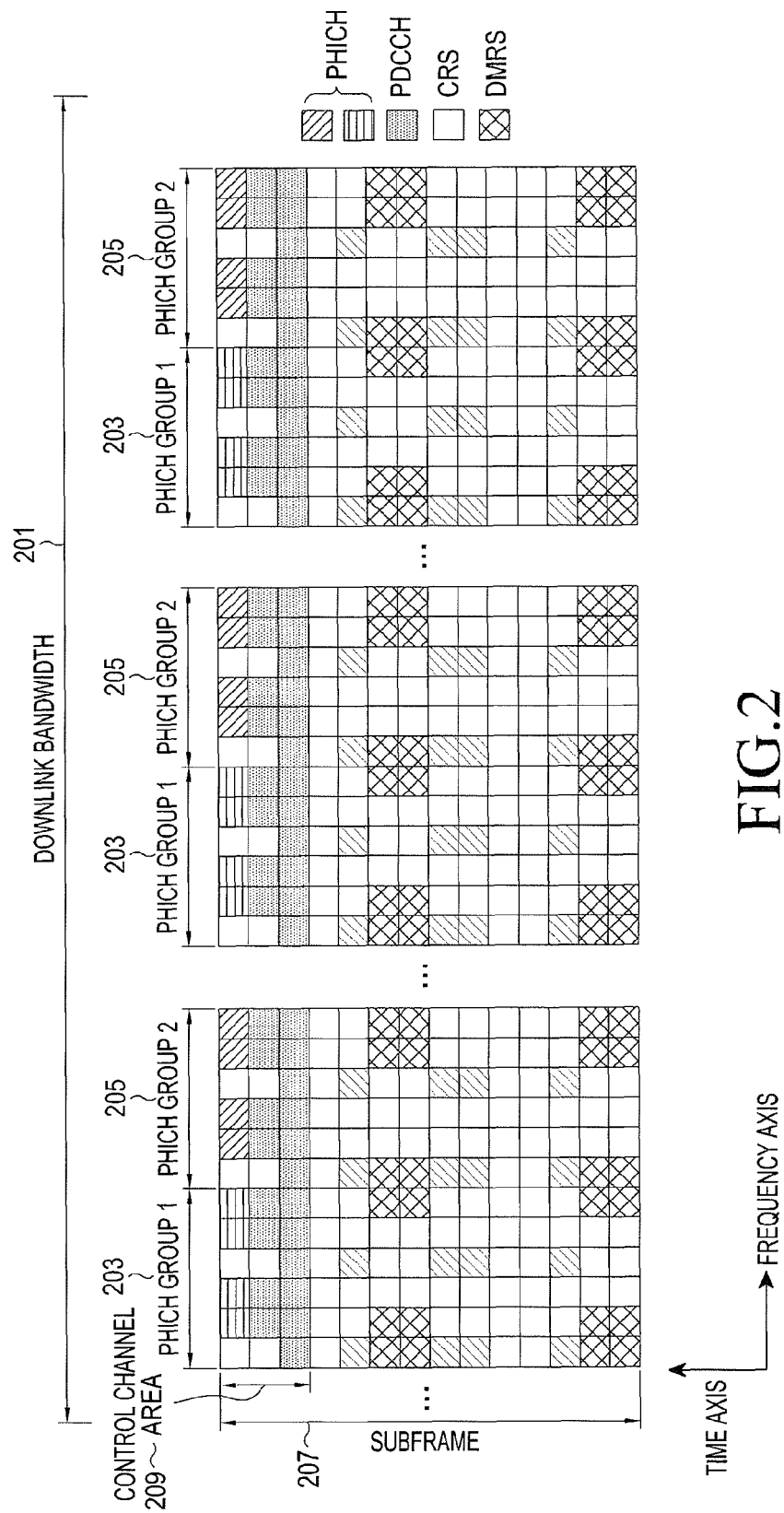
FIG. 2 is a view illustrating a control channel frame structure in the OFDM communication system.

FIG. 2 is a view illustrating a control channel frame structure in the OFDM communication system.

Referring to FIG. 2, a control channel area 209 transmits at least one physical channel signal among a physical control format indicator channel (PCFICH, hereinafter, referred to as PCFICH), a physical hybrid automatic retransmit request (HARQ) indicator channel (PHICH, hereinafter, referred to as PHICH), and the PDCCH. Here, the PCFICH means a channel indicating a number of an OFDM symbol used for the PDCCH, the PHICH means a channel transmitting a downlink response channel signal, that is, a positive response and a negative response, and the PDCCH means a channel transmitting a common control channel signal and an exclusive control channel signal.

In FIG. 2, a resource element group (REG, hereinafter, referred to as REG) is defined for multiplexing the PCFICH, the PHICH and PDCCH in the control channel area 209, and it may be defined that the REG includes four successive REs except for the CRS in one OFDM symbol. But, the definition should satisfy that one REG is not included PRBs different from each other.

After defining the REG, the PCFICH and the PHICH are assigned by selecting partial REs in each REG, and the PDCCH is assigned to REs remaining after assigning the PCFICH and the PHICH.

The PCFICH uses a total of four REGs, one group of the PHICH uses a total of three REGs, and groups of the PHICH are differently configured according to the cells, respectively. Here, the PHICH group means a unit formed by including the plurality of REGs. One PDCCH includes one or more control channel element (CCE, hereinafter, referred to as CCE), and one CCE includes a total of nine REGs. The PDCCH may include one, two, four or eight CCEs, and the PDCCH may include the CCE differently according to a channel circumstance of the terminal. The base station configures the PRB by collecting all PDCCHs of the terminal and interleaving in a unit of the REG, and transmits the PDCCH signal by using the REGs remaining after allocating the PCFICH and the PHICH to the PRB.

In one PHICH group, a total of eight PHICHs are multiplexed to four PEs, and one PHICH group is multiplexed by a code division multiplexing (CDM, hereinafter, referred to as CDM) by using eight orthogonal sequences. In addition, one PHICH group uses a total of three REGs, and each REG is repeatedly transmitted to the same PHICH group. The repeatedly used REG is transmitted through the overall downlink bandwidth.

A total amount of the PHICH group which may be transmitted to a subframe is transmitted through a physical broadcast channel (PBCH, hereinafter, referred to as PBCH), the terminal receives two kinds of information, that is, PHICH duration information and PHICH resource information, included in the PBCH in an initial access process, and the terminal detects a location of the PHICH group. The PHICH duration information provides normal mode information and extended mode information by using one bit of information.

If the PHICH duration information is indicated as the normal mode, all three repeated REGs included in one PHICH group are transmitted in a $0^{th}$ symbol of the subframe. If the PHICH duration information is indicated as the extended mode, the three repeated REGs are transmitted separately in $0^{th}$, $1^{st}$ and $2^{nd}$ symbols. Thus, in a case of the extended mode, the REG may apply all of frequency diversity and time diversity.

The PHICH resource information determines a number of usable PHICH group by using 4 bits of information. The PHICH resource is configured so as to indicate in proportional to a number of the PRB, if there are a total of N uplink PRBs, a total of eight PHICHs are included in each group, therefore, if all PRBs are transmitted to one user, a necessary number of a PHICH group is N/8. At this time, amounts of ⅙, ½, 1× and 2× the PHICH resource used in the PHICH resource group are indicated as actually used PHICH group resource.

For example, indicating 2× the PHICH resource used in the whole PHICH resource group as the actually used PHICH group resource means supporting up to a total of two users per one PRB in a case of an uplink multiple user transmission, and assigning an amount smaller than one is for preventing dissipation of the resource because an actual scheduling is not generated in correspondence to the number of the PRB.

The PHICH multiplexing may use an orthogonal sequence having a length of four and an orthogonal sequence having a length of two, the sequence in the case of the length of four may be shown as [+1 +1 +1 +1], [+1, −1, +1, −1], [+1 +1 −1 −1], [+1 −1 −1 +1], [+j +j +j +j], [+j, −j, +j, −j] and [+j +j −j −j], [+j −j −j +j], and the sequence in the case of the length of two may be shown as [+1 +1], [+1 −1], [+j +j] and [+j −j].

Figure 3:
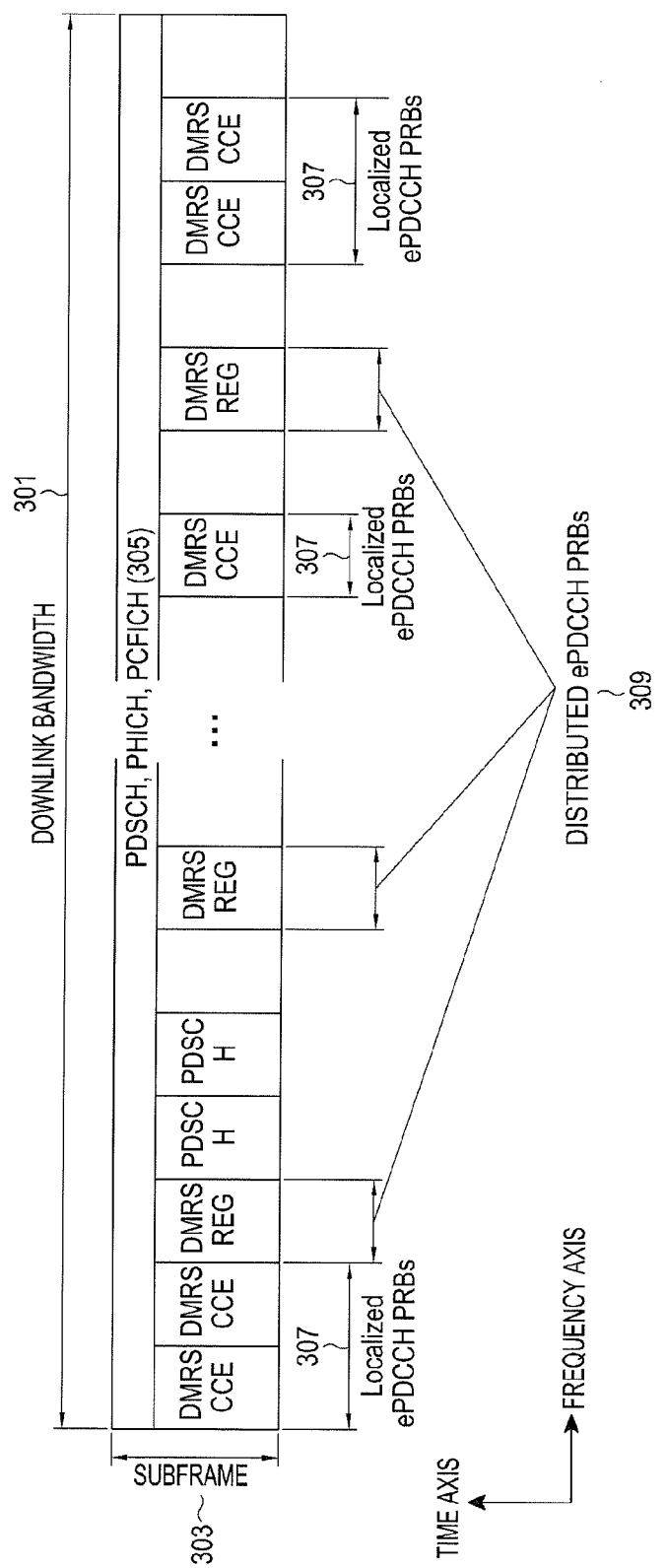
FIG. 3 is a view illustrating a method of transmitting a control channel signal based on a DMRS in the OFDM communication system according to an embodiment of the present invention.

FIG. 3 is a view illustrating a method of transmitting the control channel signal based on the DMRS in the OFDM communication system according to an embodiment of the present invention.

Referring to FIG. 3, an existing control channel signal is transmitted based on the CRS, the CRS is transmitted through all subframes and the overall downlink bandwidth, and thus the control channel signal based on the CRS is also transmitted through all subframes 303 and the overall downlink bandwidth 301.

In contrast, the DMRS is transmitted in a partial frequency bandwidth, and thus a control channel signal based on the DMRS is also transmitted in only a frequency bandwidth in which the DMRS is transmitted. As described above, among control channels carrying the control channel signal transmitted based on the DMRS, a control channel for a scheduling is referred to as an enhanced PDCCH (ePDCCH), and a response channel based on the DMRS is referred to as an enhanced PHICH (ePHICH).

It is assumed that a signal transmitted through a control channel 305 based on the CRS is received by all terminals in a cell, and thus the signal is transmitted by using a transmission scheme such as a frequency diversity and a transmission diversity.

In contrast, a signal transmitted through the control channel based on the DMRS is transmitted by using a transmission scheme for a partial user similarly to a frequency selective transmission or a beam forming used in a data channel according to the prior art, and thus the control channel signal may be transmitted with a small resource.

Thus, the signal transmitted through the control channel based on the DMRS, that is, the control channel signal based on the DMRS should simultaneously support the frequency selective transmission (i.e. a localized transmission) manner of transmitting the control channel signal to a specific terminal by using partial successive PRBs identically to a localized ePDCCH PRBs 307, and a distributed transmission manner of transmitting the control channel signal by using a partial PRB distributed on a frequency axis identically to a distributed ePDCCH PRBs 309. This is because the frequency selective transmission manner cannot secure a performance of receiving the control channel equally to the localized ePDCCH PRBs 307 if a channel state of the terminal is not good.

In addition, in the case of the distributed transmission manner, the control channel signal is transmitted by using the REG, and in the case of the frequency selective transmission manner, the control channel signal is transmitted by using the CCE.

As described above, the control channel signal based on the DMRS may be transmitted in different transmission manners according to the state of the terminal, and different PRBs may be assigned to the control channel signal based on the DMRS. Specifically, if the frequency selective transmission manner is used, the terminal should receive only its own control channel signal through a resource assigned to the terminal, and if a frequency distributed manner is used, the terminal should receive a multiplexed control signal, that is, a control channel signal which is multiplexed from a control channel signal different from the control channel signal of the terminal and transmitted to another terminal, and demodulate its own control channel signal.

At this time, the ePHICH signal should be transmitted to a plurality of terminals to receive the ePHICH signal, regardless of a transmission manner. Thus, all terminals may receive the ePHICH signal although some terminals receive the ePDCCH signal in the frequency selective transmission manner and other terminals receive the ePDCCH signal in the frequency distributed transmission manner.

Figure 4:
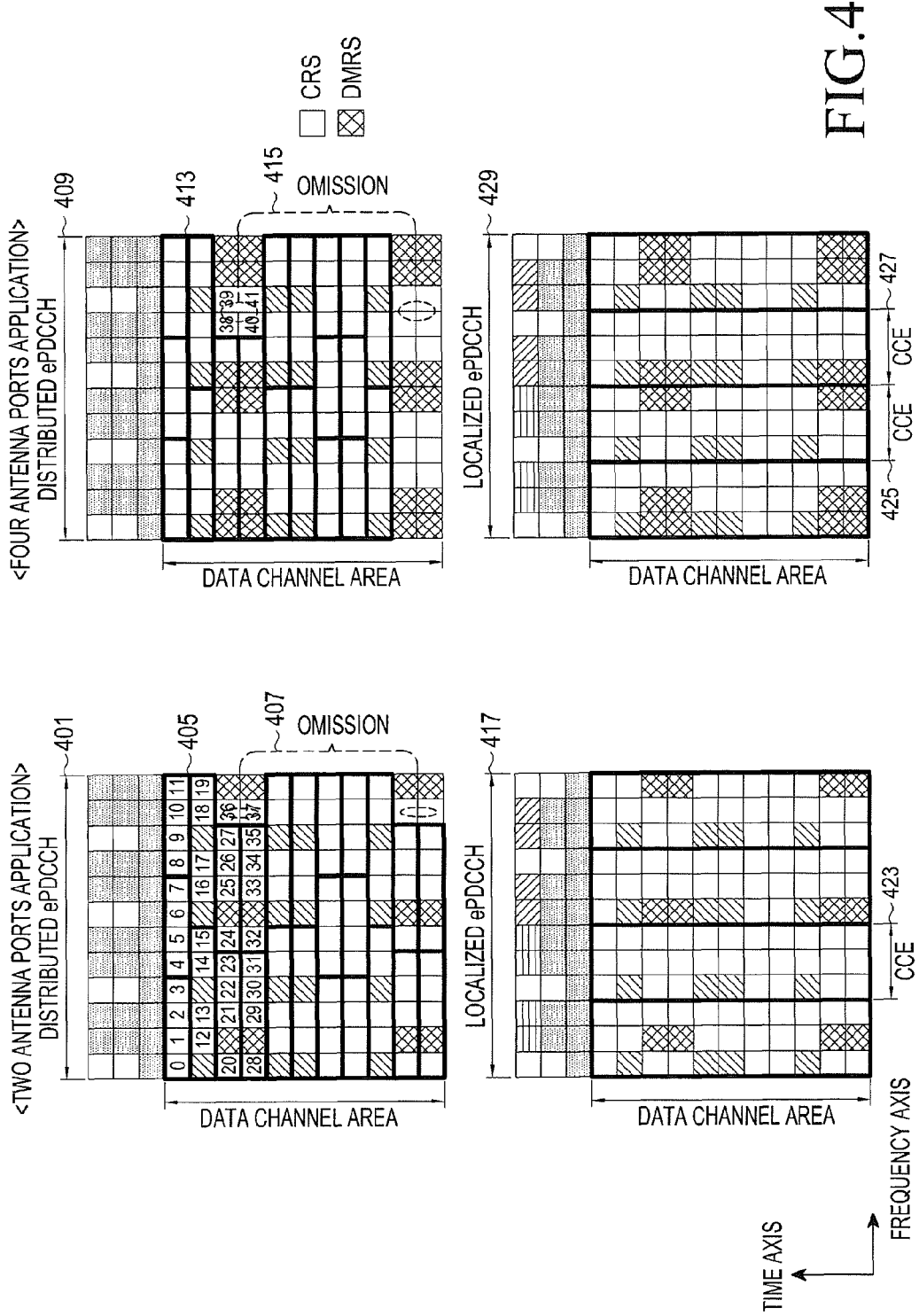
FIG. 4 is a view illustrating a PRB structure if the control channel signal is transmitted through a data channel area in the OFDM communication system according to an embodiment of the present invention.

FIG. 4 is a view illustrating a PRB structure if the control channel signal is transmitted through a data channel area in the OFDM communication system according to an embodiment of the present invention.

Hereinafter, a PRB structure 401 of a distributed ePDCCH to which the distributed transmission manner is applied and a PRB structure 417 of a localized ePDCCH to which the frequency selective manner is applied if two antenna ports are applied to the PRB, and a PRB structure 409 of the distributed ePDCCH and a PRB structure 429 of the localized ePDCCH if four antenna ports are applied to the PRB are separately described.

Referring to FIG. 4, the control channel should support all of the distributed transmission manner and the frequency selective transmission manner. A transmission location of the DMRS changes according to whether two antenna ports are applied to the PRB or four antenna ports are applied to the PRB, and thus an amount of data which may be transmitted through the control channel also changes.

According to the definition of the REG described above with reference to FIG. 2, the REG includes four successive REs except for the CRS in one OFDM symbol, and one REG should not be included in the different PRBs. That is, in describing the PRB structure shown as 401 as an example, the DMRS is not included in the REG, similarly to the CRS, and therefore, the REG may include REs 0 to 3, REs 4 to 7, REs 8 to 1, REs 12 to 15 including a diagonal line area, REs 16 to 19 including a diagonal line area, REs 20 to 23 including a diagonal line area, REs 24 to 27 including a diagonal line area, REs 28 to 31 including a diagonal line area, and REs 32 to 35 including a diagonal line area. In FIG. 4, each of RES areas are divided by a bold line.

The present invention includes a method of configuring the REG by using N number of continuous or discontinuous REs for the above-mentioned REG configuring method, and includes transmitting the RE used in the REG by sequentially using the antenna port used for transmitting the distributed transmission, regardless of the configuring method. Referring to FIG. 4, among four antenna ports 7, 8, 9 and 10 used in the distributed transmission, a first RE of one REG is transmitted by using the port 7, a second RE of one REG is transmitted by using the port 8, a third RE of one REG is transmitted by using the port 9, and the last RE of one REG is transmitted by using the port 10. This method may be equally used in the REG having N number of REs.

But, in the case of configuring the REG as described above, there is a problem of an omission of REs 36 and 37 407 in the REG configuration. Such a problem is equally generated in the PRB structure 409 of the distributed ePDCCH in the case of applying four antenna ports to the PRB, and specifically, if four antenna ports are applied to the PRB, more REs such as REs 38, 39, 40 and 41 415 are omitted in the REG configuration.

Meanwhile, in the case of the frequency selective transmission manner, the control channel signal is transmitted by using the CCE, and it is assumed that the data channel areas in the PRB structure 417 (in the case of applying two antenna ports) of the localized ePDCCH and in the PRB structure 429 (in the case of applying four antenna ports) of the localized ePDCCH are divided into 4 CCEs on the frequency axis, respectively. That is, one CCE can transmit the control channel signal by using three subcarriers on the frequency axis, at this time, in calculating the number of the RE usable in transmitting the control channel signal and included in each CCE, only one CCE 423 among the CCEs included in the PRB structure 417 of the localized ePDCCH can use four more REs in transmitting the control channel signal compared to other CCEs, and therefore, code rates of the control channel signals respectively transmitted from CCEs are different.

In addition, in the PRB structure 429 of the localized ePDCCH, two CCEs 425 and 427 among the CCEs included in the PRB structure 429 of the localized ePDCCH can use four more REs in transmitting the control channel signal compared to other CCEs, and therefore, code rates of the control channel signals respectively transmitted from CCEs are different.

Figure 5:
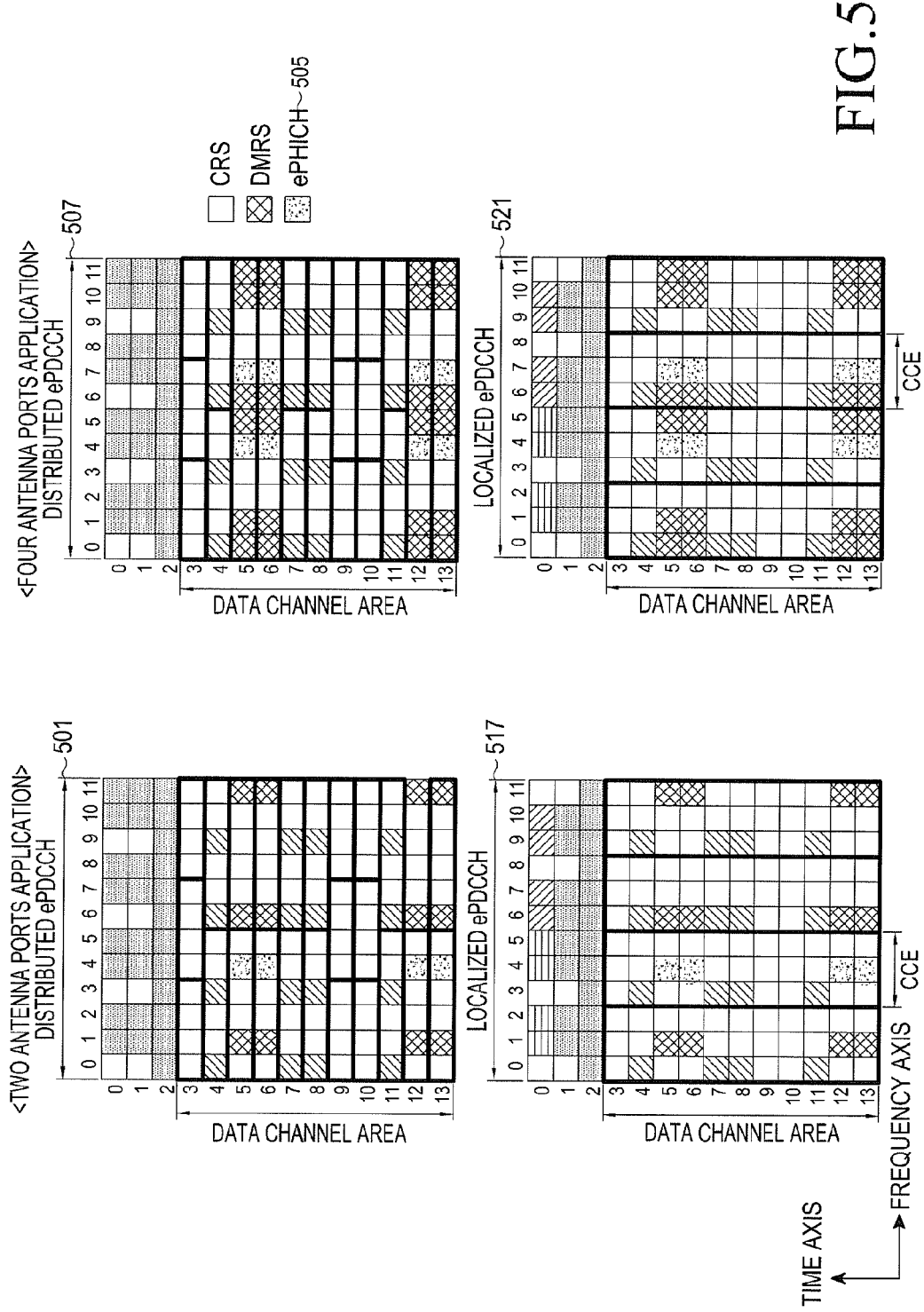
FIG. 5 is a view illustrating a method of determining a location of the ePHICH if the control channel signal is transmitted through the data channel area in the OFDM communication system according to an embodiment of the present invention.

FIG. 5 is a view illustrating a method of determining a location of the ePHICH if the control channel signal is transmitted through the data channel area in the OFDM communication system according to an embodiment of the present invention.

Hereinafter, the methods of determining the location of the ePHICH, with respect to the PRB structure 501 of the distributed ePDCCH to which the distributed transmission manner is applied and the PRB structure 517 of the localized ePDCCH to which the frequency selective manner is applied if two antenna ports are applied to the PRB, and the PRB structure 507 of the distributed ePDCCH and the PRB structure 521 of the localized ePDCCH if four antenna ports are applied to the PRB are respectively described.

Referring to FIG. 5, the location of the ePHICH in the PRB structure 501 of the distributed ePDCCH and the PRB structure 517 of the localized ePDCCH is determined as (k,l)={(4, 5), (4, 6), (4, 12), (4, 13)}. The location of the ePHICH in the PRB structure 507 of the distributed ePDCCH and the PRB structure 521 of the localized ePDCCH is determined as (k,l)={(4, 5), (4, 6), (4, 12), (4, 13)} and {(7, 5), (7, 6), (7, 12), (7, 13)}. Here, k indicates a frequency index in one PRB, and l indicates a time index.

In addition, for multiplexing with the ePHICH and the ePDCCH, the REG may be newly defined as follows. That is, the REG includes four or two successive REs on the frequency axis among remaining REs except for an RE used in the DMRS and the ePHICH in one OFDM symbol, and one REG should not be included in PRBs different from each other. According to the definition, each of the PRBs may include a different number of REGs according to a number of the antenna port.

In the above definition, the definition of the REG in the data channel area is exemplified, but in a case of defining the REG in the control channel area, the CRS, instead of the DMRS, may be considered as an excluded reference signal for configuring the REG. Determining the location 505 of the ePHICH in the PRB structure 501 of the distributed ePDCCH as (k,l)={(4, 5), (4, 6), (4, 12), (4, 13)} and determining the location 505 of the ePHICH in the PRB structure 507 of the distributed ePDCCH as (k,l)={(4, 5), (4, 6), (4, 12), (4, 13)} and {(7, 5), (7, 6), (7, 12), (7, 13)} are for maximizing a channel estimation performance of the ePHICH. That is, the closer the location of the ePHICH is to the DMRS, the more accurate the channel estimation performance of the terminal is, and therefore, it is preferable that the location of the ePHICH is disposed as closely as possible to the DMRS so as to secure the channel estimation performance in a case wherein a channel transmitted to another terminal is multiplexed identically to the ePHICH. Thus, the location 505 of the ePHICH in the PRB structure 507 of the distributed ePDCCH is disposed in a position nearest to the DMRS, that is, a position of a fourth time symbol and a position of a seventh time symbol, as shown in FIG. 5.

Meanwhile, the location 505 of the ePHICH in the PRB structure 501 of the distributed ePDCCH is disposed in a position spaced apart from the DMRS by one subcarrier on the frequency axis rather than the position nearest to the DMRS, that is, a position of the fourth time symbol rather than the position of a fifth time symbol. This is for securing the same location although the base station changes the number of the antenna port applied to the PRB from two to four.

In addition, a method of mapping in which the ePHICH is disposed as closely as possible to the DMRS does not omit the partial RE in the REG configuration in configuring the REG.

In addition, since a channel status indication-reference signal (hereinafter, referred to as CSI-RS) for a feedback of the terminal may be transmitted in different frequency locations of a time symbol identical to the proposed location, if the ePHICH is disposed in another position, a capacity of the CSI-RS may be limited. If the ePDCCH signal is transmitted in the frequency selective transmission manner in the PRB where the ePHICH is disposed, as can be confirmed from the PRB structure 517 of the distributed ePDCCH and the PRB structure 521 of the localized ePDCCH, the numbers of the REs usable in transmitting the control channel signal and included in each of the CCEs are the same, and therefore, code rates of the control channel signals respectively transmitted from the CCEs are the same.

In addition, with regard to a capacity of the ePHICH, since a terminal receiving the ePHICH is limited as a terminal receiving the ePDCCH, it is not necessary to arrange resources for all terminals, similarly to the case of the ePDCCH. That is, if the ePDCCH signal transmitted in the distributed transmission manner is received, in a case of three PRBs, a total of 75 REGs may be configured, and the REG may include a total of eight CCEs. If a signal is transmitted to one terminal through at least one CCE, a response channel for a total of eight users is necessary. In reality, since the distributed transmission manner is used in transmitting a signal to a terminal of which a channel state is not good, and a case wherein a signal is transmitted through one CCE is rare, it is sufficient to arrange eight response channels per three PRBs.

If three PRBs are transmitted in the frequency selective transmission manner, 12 CCEs in three PRBs may be transmitted, but if two antenna ports are applied to each PRB, a control channel for two users may be transmitted in correspondence to each PRB. This is because the base station transmits a control channel signal for one user through one antenna port by a beam forming scheme in the frequency selective transmission manner. In the same manner, if four antenna ports are applied, a control channel signal for a total of four users may be transmitted.

If four REs are assigned to the ePHICH in each of the PRBs, identically to the PRB structure 501 of the distributed ePDCCH, in a case of three PRBs, a total of 12 REs are assigned to the ePHICH. If a multiplexing of a length of four is performed, eight response channels may be transmitted. At this time, since a total of six antenna ports are applied to three PRBs, if one user uses one antenna port, a control channel signal for a total of six users may be multiplexed, and therefore, resources of the response channel is sufficient.

In the same manner, if four antenna ports are applied to the PRB, identically to the PRB structure 521 of the localized ePDCCH, a total of twelve antenna ports are applied to three PRBs, two ePHICH groups are transmitted from each of three PRBs, and therefore, a total of 16 ePHICHs may be transmitted. It is sufficient for a terminal receiving the control channel by using the DMRS to use the proposed technique, with regard to a response channel capacity as well.

Figure 6:
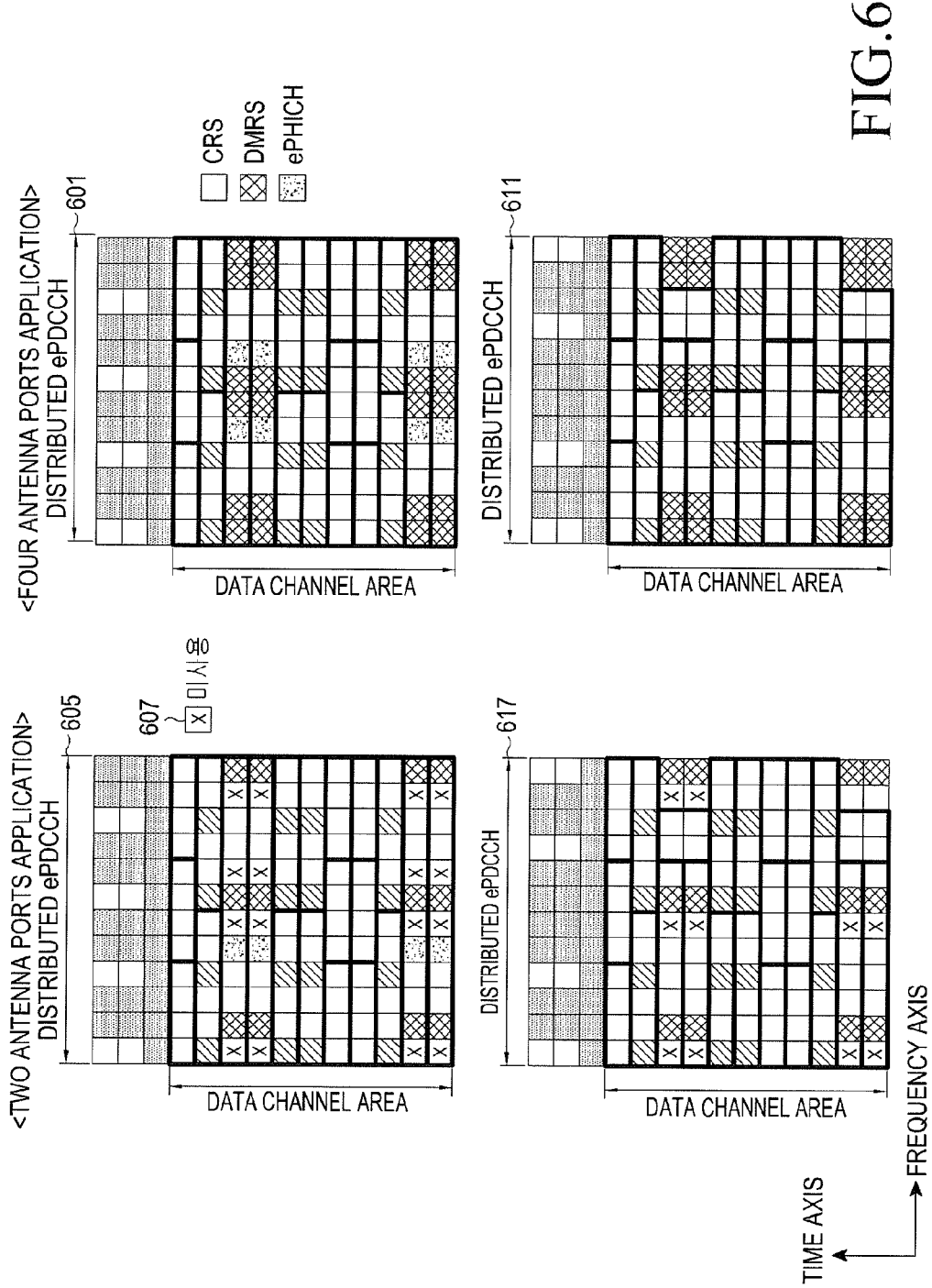
FIG. 6 is a view illustrating a method of configuring an REG according to a maximum antenna number in the data channel area in the OFDM communication system according to an embodiment of the present invention.

FIG. 6 is a view illustrating a method of configuring the REG according to a maximum antenna number in the data channel area in the OFDM communication system according to an embodiment of the present invention.

Hereinafter, PRB structures 605 and 617 of the distributed ePDCCH, to which the distributed transmission manner is applied, if two antenna ports are applied to the PRB, and PRB structures 601 and 611 of the distributed ePDCCH if four antenna ports are applied to the PRB are separately described. Especially, in the PRB structure 617 of the distributed ePDCCH if two antenna ports are applied to the PRB and the PRB structure 613 of the distributed ePDCCH if four antenna ports are applied to the PRB, the ePHICH is not defined.

Referring to FIG. 6, in a technique proposed in the present invention, a definition of the REG applied to a data channel based on the DMRS for multiplexing with the ePDCCH is as follows. That is, the REG includes four or two successive REs on the frequency axis among remaining REs except for an RE assigned to the DMRS and the ePHICH in one OFDM symbol, and one REG should not be included in PRBs different from each other. In addition, the REG configured according to the above-mentioned definition is not related to the number of antenna port, and therefore the REG has an REG pattern defined based on the maximum antenna port number. The definition with respect to the REG may be identically applied regardless of whether the ePHICH is included or not.

The PRB structures 605 and 601 of the distributed ePDCCH are structures where the ePHICH signal is transmitted, as shown in FIG. 6. An REG configured in the PRB to which four antenna ports are applied is equally applied to the PRB to which two antenna ports are applied. That is, the REG is configured in the PRB to which two antenna ports are applied, identically to the PRB to which four antenna ports are applied.

Although the base station dynamically changes the number of antenna port, the terminal may receive the control channel regardless of to the number of antenna port, in the same manner, since an amount of resources, that is, a number of RE used by the ePHICH is changed according to the number of the antenna port. Therefore, an unused RE is designated as an unused resource 607 and the REG is configured identically to the case of the PRB to which four antenna ports are applied, as shown in the PRB structure 605 of the distributed ePDCCH based on the PRB to which four antenna ports are applied.

This may also be identical to the PRB structures 617 and 611 of the distributed ePDCCH where the ePHICH is not defined. That is, the unused RE is designated as the unused resource 607 and the REG is configured identically to the case of the PRB structure 611 of the distributed ePDCCH, as shown in the PRB structure 617 of the distributed ePDCCH based on the PRB structure 611 of the distributed ePDCCH to which four antenna ports are applied.

Figure 7:
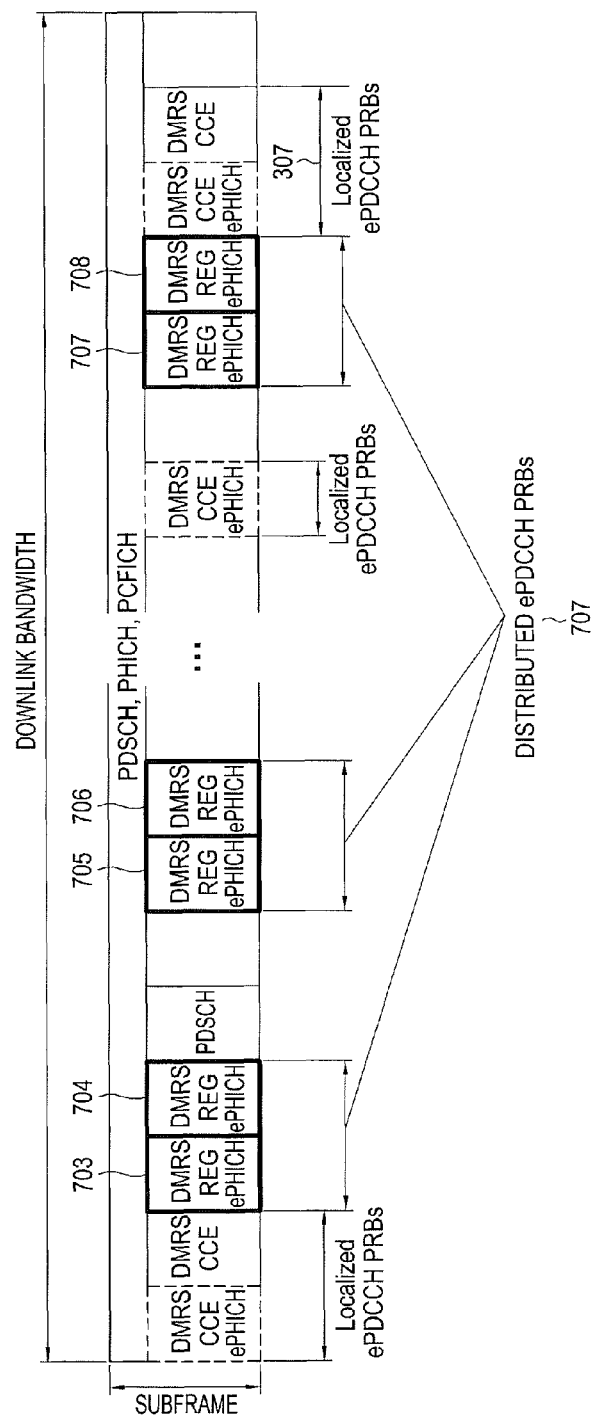
FIG. 7 is a view illustrating a method of configuring a response channel based on the DMRS in the OFDM communication system according to an embodiment of the present invention.

FIG. 7 is a view illustrating a method of configuring the response channel based on the DMRS in the OFDM communication system according to an embodiment of the present invention.

Referring to FIG. 7, a plurality of response channel groups in the response channel based on the DMRS proposed in the present invention is proportional to a number of PRB pre-assigned for transmitting the response channel by the base station. For example, if the response channel group is repeatedly transmitted three times identically to the existing case, the base station should pre-assign three PRBs 703, 705 and 707 to the terminal to transmit three repetitive response channel groups. If two response channel groups are required to be assigned, the base station assigns a total of six PRBs 703, 704, 705, 706, 707 and 708 to the terminal.

Figure 8:
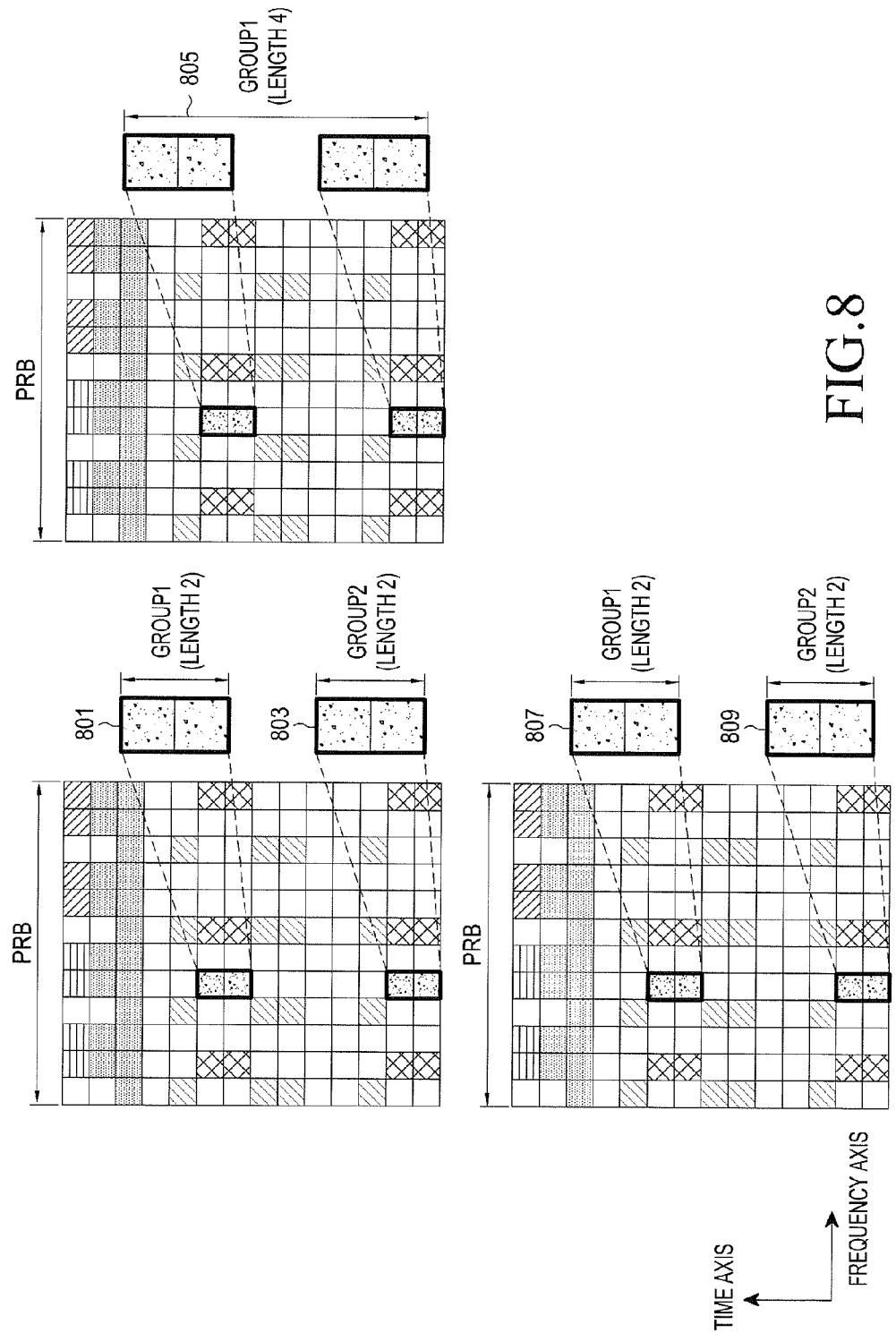
FIG. 8 is a view illustrating a method of configuring a response channel group of the response channel based on the DMRS in the OFDM communication system according to an embodiment of the present invention.

FIG. 8 is a view illustrating a method of configuring the response channel group of the response channel based on the DMRS in the OFDM communication system according to an embodiment of the present invention.

Referring to FIG. 8, with regard to the response channel group proposed in the present invention, two REs may be assigned to one response channel group by performing the CDM on a total of four response channels by using an orthogonal sequence having a length of two. As another embodiment, with regard to the response channel group proposed in the present invention, four REs may be assigned to one response channel group by performing the CDM on a total of eight response channels by using an orthogonal sequence having a length of four. As further another embodiment, with regard to the response channel group proposed in the present invention, if two antenna ports are applied to the PRB, a total of four REs may be assigned to one response channel group by performing the CDM on four response channels by using the orthogonal sequence having the length of two and by repeating the performance of the CDM twice.

That is, four response channels included in group 1 801 are multiplexed by using an orthogonal sequence [+1 +1], [+1 −1], [+j +j] and [+j −j] having a length of two, and four response channels included in a group 2 803 are also multiplexed by using the orthogonal sequence having the length of two. In this case, if two antenna ports are applied to the PRB, a total of two groups are defined in each of the PRBs, and a transmission of a total of eight response channels is possible. Furthermore, if four antenna ports are applied to the PRB, a total of four groups are defined in each of the PRBs, and a transmission of a total of 16 response channels is possible.

The eight response channels included in group 1 805 are multiplexed by using an orthogonal sequence [+1 +1 +1 +1], [+1, −1, +1, −1], [+1 +1 −1 −1], [+1 −1 −1 +1], [+j +j +j +j], [+j, −j, +j, −j], [+j +j −j −j] and [+j −j −j +j] having a length of four. In this case, if the number of the antenna ports is two, one group is defined in each PRB, and a transmission of a total of eight response channels is possible. Furthermore, if four antenna ports are applied to the PRB, a total of two groups are defined in each of the PRBs, and a transmission of a total of 16 response channels is possible.

The four response channels included in group 1 807 are multiplexed by using an orthogonal sequence [+1 +1], [+1 −1], [+j +j] and [+j −j] having a length of two, and the group 1 809 is a repetitive transmission of the response channel multiplexed in the group 1 807. In this case, if two antenna ports are applied to the PRB, a total of one group is defined in each of the PRBs, and a transmission of a total of four response channels is possible. Furthermore, if four antenna ports are applied to the PRB, a total of two groups are defined in each of the PRBs, and a transmission of a total of 8 response channels is possible. If a speed of the terminal is fast, a channel used in a first slot of the subframe and a channel used in a second slot of the subframe are different, and therefore, the orthogonal sequence having the length of two may be used if it is difficult to secure an orthogonality with the use of the orthogonal sequence having the length of four.

If the response channel is repeatedly transmitted equally to the case of the group 1 807 and 809, a capacity of the response channel is halved, but a time diversity gain between the slots is obtained, thereby securing better reception performance.

Figure 9:
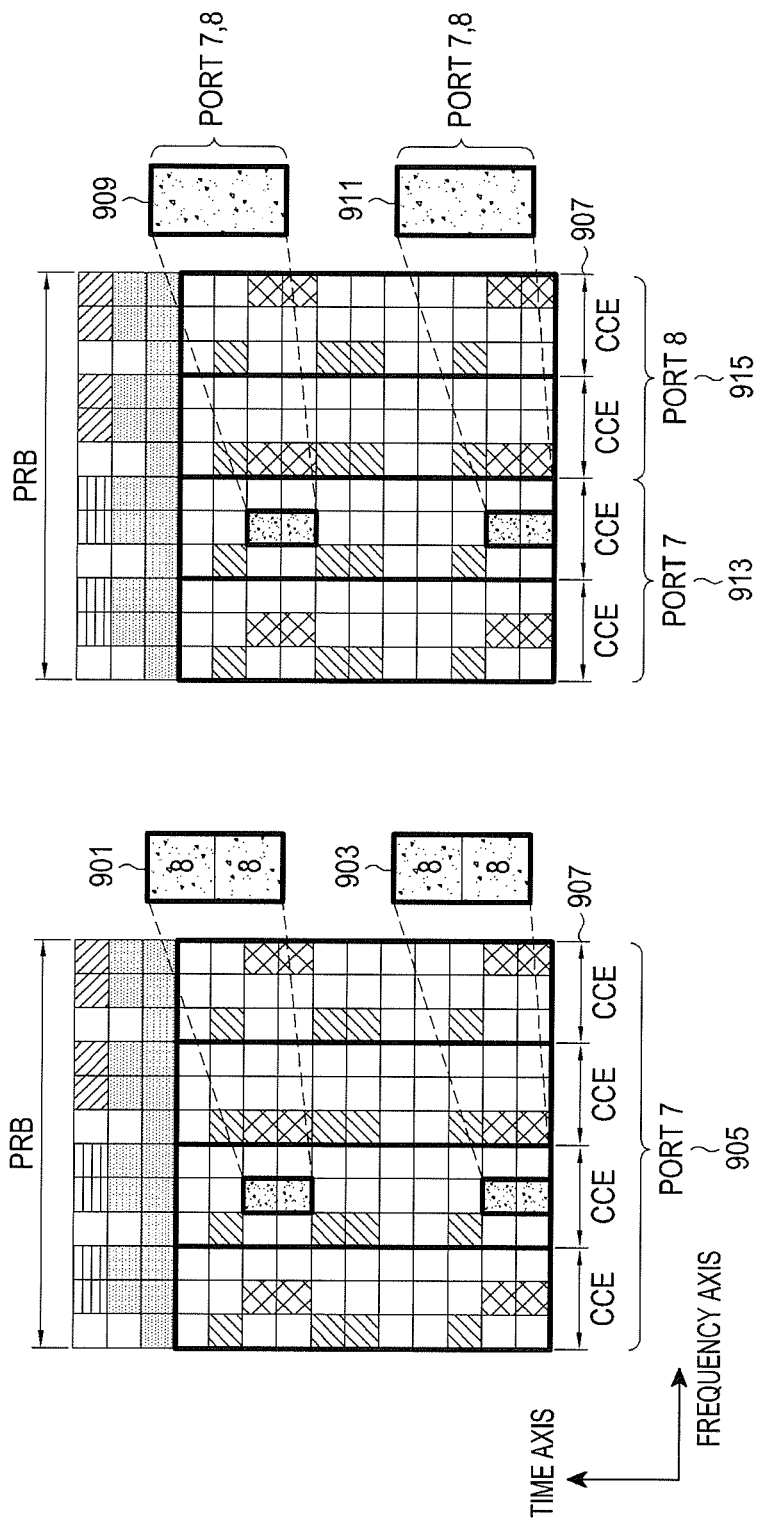
FIG. 9 is a view illustrating a method of assigning an antenna port in the response channel based on the DMRS proposed in the present invention.

FIG. 9 is a view illustrating a method of assigning the antenna port in the response channel based on the DMRS proposed in the present invention.

Referring to FIG. 9, the response channel may obtain a transmission diversity between the PRBs where the repetitive response channel group is transmitted, by applying a precoding used in the DMRS for transmitting the ePDCCH to the PRB where a corresponding response channel is transmitted. That is, the antenna port used in the response channel and the precoding applied to the antenna port apply the antenna port and the precoding used for the ePDCCH where a corresponding PRB is transmitted. At this time, the transmission manner used in the ePDCCH, that is, the distributed transmission manner or the frequency selective transmission manner, is not considered, and the same precoding is applied regardless of the transmission manner.

If one ePHICH is transmitted through three PRBs, the control channel signal transmitted from three PRBs is transmitted in the distributed transmission manner or the frequency selective transmission manner.

In the case of the control channel signal transmitted in the distributed transmission manner, the corresponding PRB transmits the control channel signal according to each of antennas for the transmission diversity, and the control channel signal may be received by a plurality of terminals. At this time, if the same precoding is applied to the ePHICH from the PRB for a transmission diversity of a reference signal by which the ePDCCH is transmitted, the ePHICH may be received by the plurality of the terminals similarly to the ePDCCH, and the corresponding terminal may receive the ePHICH of the corresponding PRB, that is, its own control channel signal.

If the ePDCCH of the PRB from which the ePHICH is transmitted is transmitted in the frequency selective transmission manner, each of the antenna parts forms a beam pattern for the terminals and uses a precoding in correspondence to the beam pattern. Therefore, the precodings different from each other are applied to each of the DMRSs of a total of three PRBs from which the one response channel is transmitted. In addition, the different precodings are applied according to each of the PRBs and each of the antennas of the PRBs. From the point of view of a reception terminal, the response channel is transmitted identically to a transmission diversity manner where the response channel is randomly pre-coded according to each of the antennas in the PRB and transmitted. Therefore, all terminals may receive the response channel in the transmission diversity manner from the corresponding PRB regardless of the transmission mode of the ePDCCH.

Antenna ports 7 and 8 909 indicate antenna ports used by the response channel if two antenna ports are applied to the PRB. If the control channel signal is transmitted according to the frequency selective transmission manner by using one PRB, an antenna port 7 913 and an antenna port 8 915 transmit the control channel signal by applying the precoding for different terminals, respectively. The antenna port 7 913 is used by the shown two CCEs and the antenna port 8 915 is also used by the shown two CCEs. In this case, the transmission diversity manner using the different precodings by using both antenna ports 7 and 8 is applied to each of the response channel signals 909 and 911.

As another embodiment, the PRB from which the ePHICH is transmitted for transmitting the DMRS response channel enables a reference signal remaining after pre-assigning at least one response channel for transmitting the ePHICH to be used in transmitting the ePDCCH, and the same precoding to be applied between the PRBs. This is a pre-assigning of one port for the ePHICH regardless of the number of the antenna port per PRB.

As described above, if one port is pre-assigned for the PHICH, the base station transmits the ePHICH by using a unitary precoding, thereby enabling all terminals to identically receive the response channel although each terminal receives the response channel from any PRB. However, if two antenna ports are applied to the PRB, one antenna port is used in the response channel and another antenna port is used in the ePDCCH, and in this case, since the response channel and the control channel use one antenna, respectively, the diversity transmission for a space multiplexing is impossible.

In addition, if four antenna ports are applied to the PRB, in a case wherein one antenna port is used in the response channel, the other three antenna ports are used in the ePDCCH. Also in this case, if the antenna ports use the frequency selective transmission manner, since 4 CCEs are transmitted, respective CCEs may not be applied to different terminals.

Figure 10:
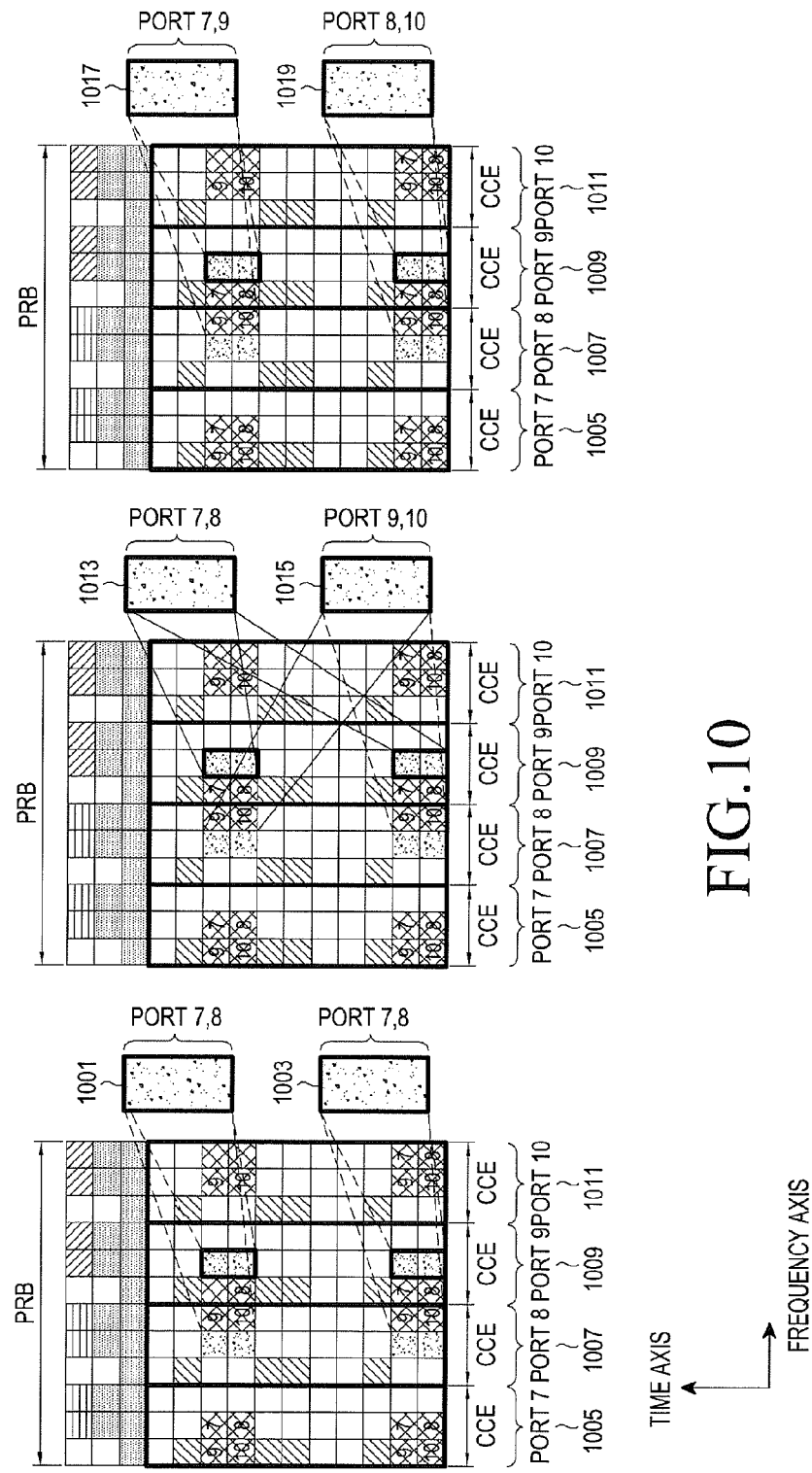
FIG. 10 is a view illustrating an example of an antenna port configuration if a transmission diversity is formed through a random precoding in each PRB in a case of applying four antenna ports to each PRB in the OFDM communication system according to an embodiment of the present invention.

FIG. 10 is a view illustrating an example of an antenna port configuration if a transmission diversity is formed through a random precoding in each PRB in a case of applying four antenna ports to each PRB in the OFDM communication system according to an embodiment of the present invention.

Referring to FIG. 10, in a proposed method of configuring the antenna port, the response channel is transmitted by using a total of two antennas regardless of the number of the antenna port. As another embodiment, in the proposed method of configuring the antenna port, the number of the antenna port to be used in transmitting the response channel is determined in proportion to a total number of the antenna port.

That is, in the method, if the total number of the antenna ports is two, the response channel is transmitted through two antennas, and if the number of the antenna ports is four, the response channel is transmitted through four antennas. An advantage of the method of transmitting the response channel by always using two antenna ports regardless of the number of the antenna port is being able to transmit the response channel with four ports by using two antennas, if the number of the antenna ports is four in reality. This is because four antenna ports may not secure that the base station has four antennas in reality. That is, although the base station has two antennas, for example, antennas A and B, the antenna ports 7 and 8 may be transmitted through the antennas A and B, and the antenna ports 9 and 10 may be transmitted through the same antennas A and B.

In the antenna ports 7 and 8 1001 and 1003, the number of the antenna ports applied to each PRB is four, but only two antenna ports are used in transmitting the response channel. In this case, the first slot and the second slot use the same antenna port. In this case, the CCE of the control channel may use antenna ports different from each other, but an actual number of the antennas may be two, therefore the response channel is configured based on two antennas.

If the ports 7 and 8 1001 and 1003 are configured, in a case wherein the actual number of the antennas of the base station is four, the remaining two antennas may not be used. As an advantage of the corresponding technique, the corresponding technique may be equally applied to multiplexing sequences, having lengths of two and four, of the response channel.

If the number of the antenna ports applied to each PRB is four similarly to ports 7 and 8 1013 and ports 9 and 10 1015, but only two antenna ports are used based on one response channel, the first slot and the second slot use antenna ports different from each other. In this case, the control channel signals are transmitted by using different antenna ports, respectively, but the response channel uses only a total of two antenna ports in each group.

As a disadvantage of this case, since orthogonality breaks down in a response channel group having a length of four, the above-mentioned method cannot be applied. In contrast, as an advantage of this case, although the base station has a total of two antenna ports, since different precodings are used according to each antenna port, if information such as the ports 7 and 8 1013 and the ports 9 and 10 1015 are transmitted, a transmission diversity effect may be obtained. In addition, if the base station has a total of four antennas, all of a transmission diversity and an antenna diversity to which a precoding is equally applied may be obtained.

Ports 7 and 9 1017 and ports 8 and 10 1019 use four ports different from each other equally to the ports 7 and 8 1013 and the ports 9 and 10 1015, there is a difference in that a physically orthogonal antenna port is used in one group in a case of the ports 7 and 9 1017. Actually, since the CDM is performed on the antenna ports 7 and 8 and the antenna ports 7 and 8 perform a transmission, orthogonality of a channel of the antenna ports 7 and 8 becomes lower than that of the antenna ports 7 and 9. Therefore, if the ports 7 and 9 1017 and the ports 8 and 10 1019 are configured, performances of a channel estimation along with a transmission diversity due to a precoding may be more improved based on one response channel.

Figure 11:
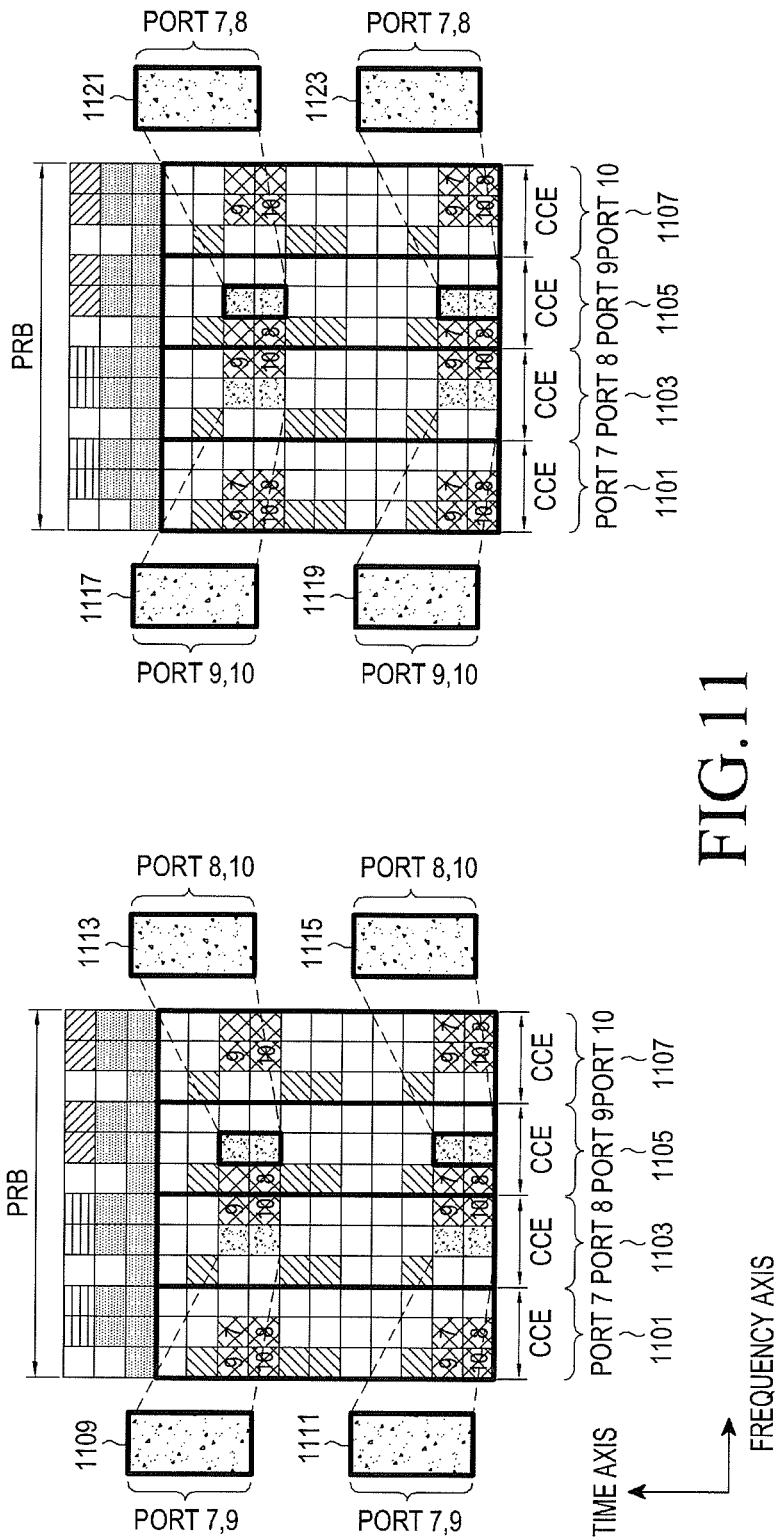
FIG. 11 is a view illustrating an example wherein antenna ports different from each other are used according to each response channel in the OFDM communication system according to an embodiment of the present invention.

FIG. 11 is a view illustrating an example wherein antenna ports different from each other are used according to each response channel in the OFDM communication system according to an embodiment of the present invention.

Referring to FIG. 11, the antenna port used by the control channel and the antenna port used by the response channel are connected, and therefore, the terminal may use only the antenna port, used in receiving the control channel, in receiving the response channel.

Ports 8 and 10 1113 and 1115 transmit the response channel signal by using ports 8 and 10, if the terminal uses the antenna port 8 or 10 in receiving the control channel signal, similarly to 1103 and 1107, the terminal does not receive a signal shown in 1109 and 1111, and may receive only a response channel using the same antenna port as shown in 1113 and 1115. In this case, it is not necessary for the terminal to estimate a channel of the antenna port unrelated to the terminal, thereby lowering a complexity of the terminal.

A case of ports 7 and 8 1121 and 1123 is identical to the above-mentioned case, and the corresponding example is a method wherein the base station transmits a signal by using a port of a reference signal nearest to the response channel. As shown in 1121 and 1123, since nearest reference signals are close to the ports 7 and 8, the shown 1121 and 1123 signals are transmitted by using the ports 7 and 8, and since shown 1117 and 1119 are nearest to the antenna ports 9 and 10, the shown 1117 and 1119 signals are transmitted by using nearest antenna ports 9 and 10 for better channel estimation.

Figure 12:
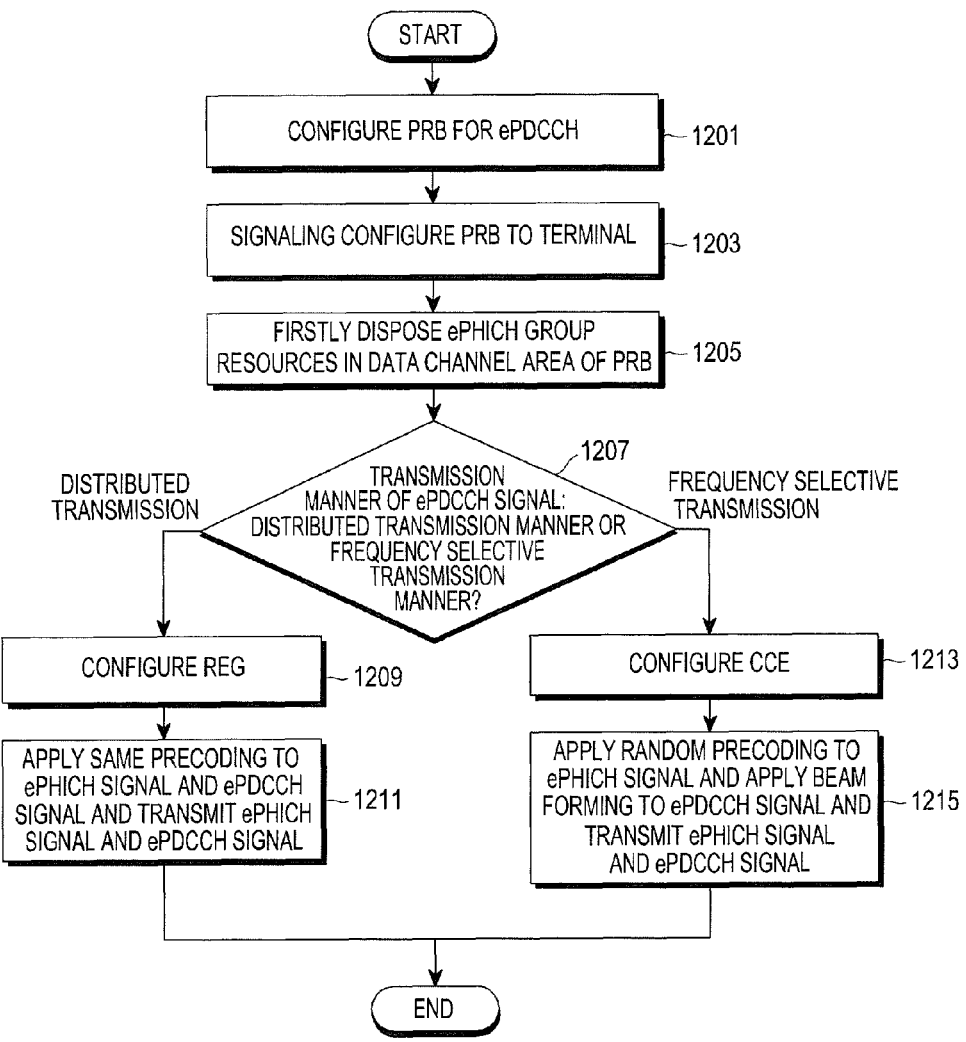
FIG. 12 is a flowchart illustrating an operation of transmitting the control channel signal by a base station in the OFDM communication system according to an embodiment of the present invention.

FIG. 12 is a flowchart illustrating an operation of transmitting the control channel signal by the base station in the OFDM communication system according to an embodiment of the present invention.

Referring to FIG. 12, the base station configures the PRB for the control channel, for example, the ePDCCH, based on the DMRS in step 1201, and progresses to step 1203. The base station performs a signaling of the configured PRB on the terminal in step 1203, and progresses to step 1205.

The base station firstly disposes the ePHICH group resource in the data channel area of the PRB in step 1205, and progresses to step 1207. The base station checks whether the transmission manner of the ePDCCH signal is the distributed transmission manner or the frequency selective transmission manner in step 1207.

As a result of the checking in step 1207, if the transmission manner of the ePDCCH is the distributed transmission manner, the base station progresses to step 1209 to configure the REG with the four or two REs successive on the frequency axis among the remaining REs except for the RE used in the DMRS and the ePHICH in one OFDM symbol according to the definition of the REG described with reference to FIG. 5, and progresses to step 1211. The base station applies the same precoding to the ePHICH and the ePDCCH transmitted from the corresponding PRB and transmits the ePHICH and the ePDCCH in step 1211.

Meanwhile, as the result of the checking in step 1207, if the transmission manner of the ePDCCH signal is the frequency selective transmission manner, the base station progresses to step 1213, configure the CCE by using three successive subcarriers, and progresses to step 1215. The base station applies the random precoding to the ePHICH signal according to the number of antenna ports which are two or four antenna ports applied to the corresponding PRB, applies the beam forming to the ePDCCH signal, and transmits the ePHICH signal and ePDCCH signal in step 1215.

Figure 13:
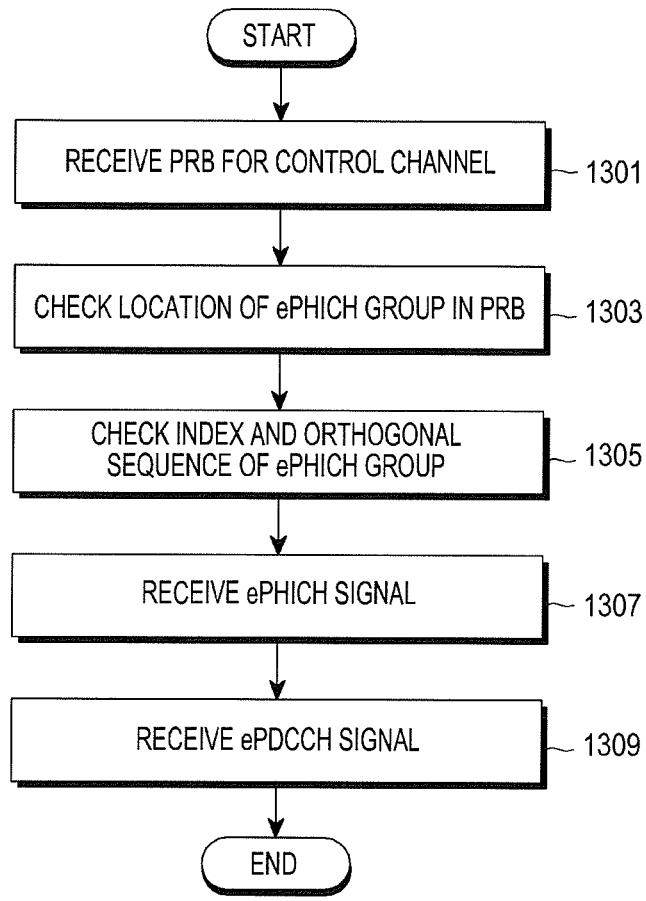
FIG. 13 is a flowchart illustrating an operation of receiving the control channel signal by a terminal in the OFDM communication system according to an embodiment of the present invention.

FIG. 13 is a flowchart illustrating an operation of receiving the control channel signal by the terminal in the OFDM communication system according to an embodiment of the present invention.

Referring to FIG. 13, the terminal receives the PRB for the control channel based on DMRS transmitted from the base station in step 1301, and progresses to step 1303. The terminal checks the location of the ePHICH group in the PRB in step 1303 and progresses to step 1305.

The terminal checks index information and orthogonal sequence information of the ePHICH group in step 1305, and progresses to step 1307. The terminal receives the ePHICH signal from each of the PRBs by using the DMRS used in the ePHICH and received by the terminal, estimates a channel in correspondence to a transmission mode in the corresponding PRB, and receives the ePDCCH signal in step 1307.

Figure 14:
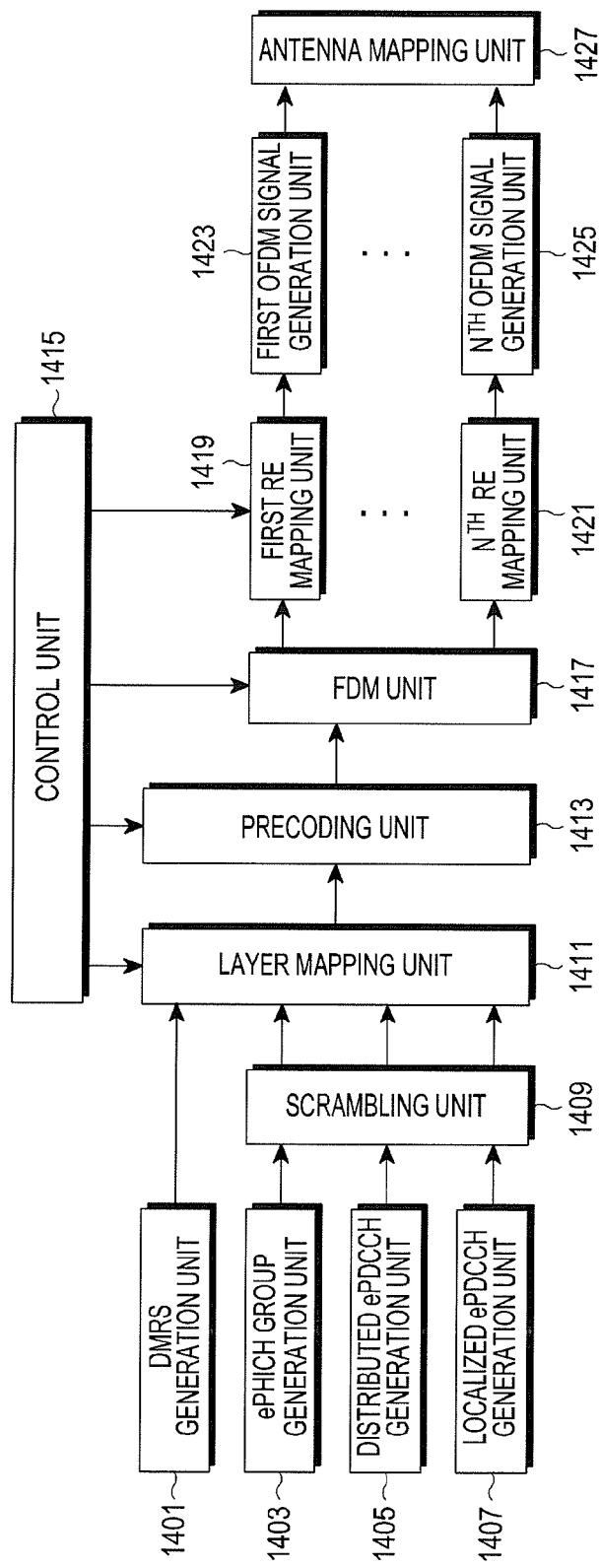
FIG. 14 is a view illustrating a base station apparatus for transmitting the control channel signal in the OFDM communication system according to an embodiment of the present invention.

FIG. 14 is a view illustrating a base station apparatus for transmitting the control channel signal in the OFDM communication system according to an embodiment of the present invention.

Referring to FIG. 14, a DMRS generation unit 1401 outputs the DMRS, an ePHICH group generation unit 1403 outputs the ePHICH group signal, a distributed ePDCCH generation unit 1405 outputs the distributed ePDCCH signal, and a localized ePDCCH 1407 outputs the localized ePDCCH signal.

A scrambling unit 1409 receives the ePHICH group signal, the distributed ePDCCH signal and the localized ePDCCH signal, scrambles the control signals to the ePHICH group signal, the distributed ePDCCH signal and the localized ePDCCH signal, and outputs the scrambled ePHICH group signal, distributed ePDCCH signal and localized ePDCCH signal.

A layer mapping unit 1411 receives the DMRS, a signal output from the scrambling unit 1409 and a control signal output from a control unit 1415, performs a layer mapping with respect to each channel in correspondence to the corresponding transmission manner, and outputs the layer-mapped signals.

A precoding unit 1413 receives the signal output from the layer mapping unit 1411, performs the precoding with respect to each PRB, and outputs the pre-coded signal to an FDM unit 1417. The FDM unit 1417 multiplexes the output signal of the precoding unit 1413 with other channel signals and outputs the multiplexed signals to first to $N^{th}$ RE mapping units 1419 and 1421.

The first to $N^{th}$ RE mapping units 1419 and 1421 assign a data symbol to each layer, generates an OFDM signal through first to $N^{th}$ OFDM signal generation units 1423 and 1425, and output the OFDM signal.

The antenna mapping unit 1427 receives outputs of the first to $N^{th}$ OFDM signal generation units 1423 and 1425, maps and transmits the outputs of the first to $N^{th}$ OFDM signal generation units 1423 and 1425 to the antenna port.

Figure 15:
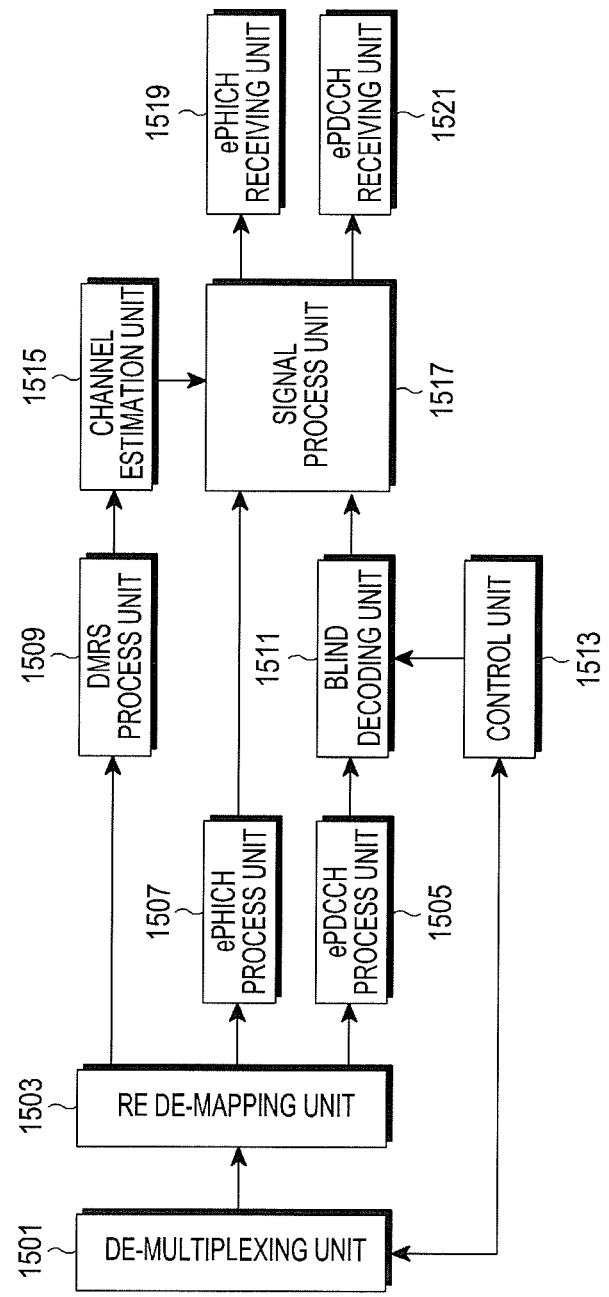
FIG. 15 is a view illustrating a terminal apparatus for receiving the control channel signal in the OFDM communication system according to an embodiment of the present invention.

FIG. 15 is a view illustrating a terminal apparatus for receiving the control channel signal in the OFDM communication system according to an embodiment of the present invention.

Referring to FIG. 15, a de-multiplexing unit 1501 receives a signal transmitted from the base station by using a control signal output from a control unit 1513, performs a de-multiplexing, and outputs the de-multiplexed signal. An RE de-mapping unit 1503 receives the output of the de-multiplexing unit 1501, and detects and outputs a control channel signal.

Among signals output from the de-multiplexing unit 1501, the DMRS is input to a DMRS process unit 1509, the ePHICH signal is input to an ePHICH process unit 1507, and the ePDCCH signal is input to an ePDCCH process unit 1505.

The DMRS process unit 1509 processes the DMRS and outputs the processed DMRS to a channel estimation unit 1515, and the channel estimation unit 1515 estimates a channel of each antenna port and outputs the estimated channel to a signal process unit 1517. The ePHICH process unit 1507 demodulates the ePHICH signal and outputs the demodulated ePHICH signal to the signal process unit 1517.

Meanwhile, since the ePDCCH process unit 1505 receives all pre-assigned usable resources and cannot demodulate the ePDCCH signal, the ePDCCH process unit 1505 receives the ePDCCH signal through a blind decoder 1511.

The signal process unit 1517 outputs the ePHICH signal and the ePDCCH signal among received signals to receiver, respectively. That is, the ePHICH receiver 1519 receives the response channel information, and the ePDCCH receiver 1521 receives scheduling information.

The present invention suggests a method and an apparatus for transmitting a downlink control channel signal in an OFDM communication system. Through this, if a control channel signal multiplexed in a PRB is transmitted, the present invention enables a multiplexing of the control channel signal transmitted in a distributed transmission manner without loss of a resource, and enables transmitting the control channel signal while equally maintaining all coding rates between the control channel signals if the control channel signal is transmitted in a frequency selective transmission manner.

In addition, the present invention supports a transmission manner in which multiple terminals may receive one response channel signal by simultaneously using a DeModulation Reference signal (hereinafter, referred to as DMRS) or simultaneously using a partial DMRS, regardless of transmitting the control channel signal, transmitted from a PRB to which a response channel signal is transmitted, by using a transmission diversity scheme or by using a beam forming scheme.

While the present invention has been shown and described with reference to certain embodiments thereof, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

The invention claimed is:

1. A method of transmitting a control channel signal by a base station in an orthogonal frequency division multiplexing (OFDM) communication system, the method comprising:
   configuring a physical resource block (PRB) including a plurality of resource elements (REs) for the control channel signal for a scheduling;
   assigning at least one resource element (RE) occupying a time domain equal to an RE used in transmitting a reference signal in a data channel region of the PRB and occupying a frequency domain nearest to the RE used in transmitting the reference signal to a response channel signal;
   transmitting the control channel signal and the response channel signal; and
   configuring a resource element group (REG) including four or two REs successive on a frequency axis among remaining REs except for the RE used in transmitting the reference signal and the RE used in transmitting the response channel signal in one OFDM symbol, if the control channel signal is transmitted in a distributed transmission manner, wherein REs configuring one REG are included in one PRB, and
   wherein a number of response channel groups including a plurality of REGs is proportional to a number of antenna ports of the base station, and is inversely proportional to a length of an orthogonal sequence used in transmitting the response channel signal.

2. The method of claim 1, wherein the control channel signal and the response channel signal are transmitted by applying a same precoding.

3. The method of claim 1, further comprising configuring a control channel element (CCE) including three successive subcarriers, if the control channel signal is transmitted in a frequency selective transmission manner.

4. The method of claim 3, wherein the control channel signal is transmitted by applying a beam forming, and wherein the response channel signal is transmitted by applying a random precoding.

5. A method of receiving a control channel signal by a terminal in an orthogonal frequency division multiplexing (OFDM) communication system, the method comprising:
   receiving a physical resource block (PRB) including a plurality of resource elements (REs) for the control channel signal for a scheduling;
   identifying at least one RE occupying a time domain equal to an RE used in transmitting a reference signal in a data channel region of the PRB and occupying a frequency domain nearest to the RE used in transmitting the reference signal; and
   receiving a response channel signal and the control channel signal transmitted by using at least one RE,
   wherein the control channel signal is received by using a resource element group (REG) including four or two REs successive on a frequency axis among remaining REs except for the RE used in transmitting the reference signal and an RE used in transmitting the response channel signal in one OFDM symbol, if a distributed transmission manner is applied to the control channel signal, and REs configuring one REG are included in one PRB, and
   wherein a number of response channel groups including a plurality of REGs is proportional to a number of antenna ports of a base station, and is inversely proportional to a length of an orthogonal sequence used in transmitting the response channel signal.

6. The method of claim 5, wherein a same precoding is applied to the control channel signal and the response channel signal.

7. The method of claim 5, wherein the control channel signal is received by using a control channel element (CCE) including three successive subcarriers, if a frequency selective transmission manner is applied to the control channel signal.

8. The method of claim 7, wherein a beam forming is applied to the control channel signal, and wherein a random precoding is applied to the response channel signal.

9. A base station for transmitting a control channel signal in frequency division multiplexing (OFDM) communication system, the base station comprising:
a generator configured to:
configure a physical resource block (PRB) including a plurality of resource elements (REs) for the control channel signal for a scheduling; and
assign at least one RE occupying a time domain equal to an RE used in transmitting a reference signal in a data channel region of the PRB and occupying a frequency domain nearest to the RE used in transmitting the reference signal, to a response channel signal; and
a transceiver configured to transmit the control channel signal for the scheduling and the response channel signal, wherein the generator is configured to configure a resource element group (REG) including four or two REs successive on a frequency axis among remaining REs except for the RE used in transmitting the reference signal and an RE used in transmitting the response channel signal in one OFDM symbol, if the control channel signal is transmitted in a distributed transmission manner, and REs configuring one REG are included in one PRB, and
wherein a number of response channel groups including a plurality of REGs is proportional to a number of antenna ports of the base station, and is inversely proportional to a length of an orthogonal sequence used in transmitting the response channel signal.

10. The base station of claim 9, wherein the transceiver is configured to transmit the control channel signal and the response channel signal by applying a same precoding to the control channel signal and the response channel signal.

11. The base station of claim 9, wherein the generator is configured to configure a control channel element (CCE) with three successive subcarriers, if the control channel signal is transmitted in a frequency selective transmission manner.

12. The base station of claim 11, wherein the transceiver is further configured to:
transmit the control channel signal by applying a beam forming to the control channel signal; and
transmit the response channel signal by applying a random precoding to the response channel signal.

13. A terminal for receiving a control channel signal in an orthogonal frequency division multiplexing (OFDM) communication system, the terminal comprising:
a resource element (RE) inverse mapping circuit configured to;
receive a physical resource block (PRB) including a plurality of REs for the control channel signal for a scheduling; and
identify at least one RE occupying a time domain equal to an RE used in transmitting a reference signal in a data channel region of the PRB and occupying a frequency domain nearest to the RE used in transmitting the reference signal; and
a transceiver configured to receive a response channel signal and the control channel signal for the scheduling transmitted by using at least one RE, wherein a number of response channel groups including a plurality of REGs is proportional to a number of antenna ports of a base station, and is inversely proportional to a length of an orthogonal sequence used in transmitting the response channel signal.

14. The terminal of claim 13, wherein the transceiver is configured to receive the control channel signal by using a resource element group (REG) including four or two REs successive on a frequency axis among remaining REs except for the RE used in transmitting the reference signal and an RE used in transmitting the response channel signal in one OFDM symbol, if a distributed transmission manner is applied to the control channel signal.

15. The terminal of claim 14, wherein a same precoding is applied to the control channel signal and the response channel signal.

16. The terminal of claim 13, wherein the transceiver is configured to receive the control channel signal by using a control channel element (CCE) including three successive subcarriers, if a frequency selective transmission manner is applied to the control channel signal.

17. The terminal of claim 16, wherein a beam forming is applied to the control channel signal, and wherein a random precoding is applied to the response channel signal.

* * * * *